United States Patent
Bak et al.

(10) Patent No.: US 6,704,927 B1
(45) Date of Patent: Mar. 9, 2004

(54) STATIC BINDING OF DYNAMICALLY-DISPATCHED CALLS IN THE PRESENCE OF DYNAMIC LINKING AND LOADING

(75) Inventors: Lars Bak, Palo Alto, CA (US); Srdjan Mitrovic, Redwood Shores, CA (US); Urs Hölzle, Goleta, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/265,770

(22) Filed: Mar. 10, 1999

Related U.S. Application Data

(60) Provisional application No. 60/079,765, filed on Mar. 24, 1998.

(51) Int. Cl.[7] .............................. G06F 9/45; G06F 9/44
(52) U.S. Cl. ....................... 717/151; 717/139; 717/140; 717/148; 717/152; 717/153; 717/165
(58) Field of Search .......................... 717/5, 9, 10, 136, 717/151, 162, 138–141, 145–148, 152–167; 709/300–305, 315, 310, 321, 328, 330, 331

(56) References Cited

U.S. PATENT DOCUMENTS

| | | | | |
|---|---|---|---|---|
| 5,579,518 | A | | 11/1996 | Yasumatsu .................... 717/131 |
| 5,606,699 | A | | 2/1997 | De Pauw et al. ............ 709/315 |
| 5,613,120 | A | | 3/1997 | Palay et al. .................. 717/165 |
| 5,748,961 | A | * | 5/1998 | Hanna et al. ................ 717/100 |
| 5,764,989 | A | * | 6/1998 | Gustafsson et al. .......... 717/129 |
| 5,966,537 | A | * | 10/1999 | Ravichandran .............. 717/161 |
| 5,983,020 | A | * | 11/1999 | Sweeney et al. ............. 717/141 |
| 5,983,021 | A | * | 11/1999 | Mitrovic ...................... 717/158 |
| 6,063,128 | A | * | 5/2000 | Bentley et al. ................. 703/6 |
| 6,085,035 | A | * | 7/2000 | Ungar ......................... 717/116 |
| 6,230,314 | B1 | * | 5/2001 | Sweeney et al. ............. 717/108 |
| 6,240,547 | B1 | * | 5/2001 | Holzle et al. ................ 717/141 |
| 6,260,075 | B1 | * | 7/2001 | Cabrero et al. .............. 709/310 |
| 6,282,581 | B1 | * | 8/2001 | Moore et al. ................ 709/316 |

FOREIGN PATENT DOCUMENTS

| WO | WO 96/35990 | 11/1996 | ........... G06F/9/445 |
|---|---|---|---|

OTHER PUBLICATIONS

Karkowski–Corporaal, Overcoming the Limitations of the Traditional Loop Parallelization, 1998, Delft University of Technology.*

J. Dean et al., "Optimization of Object–Oriented Programs Using Static Class Hierarchy Analysis", Aug. 1995, ECOOP'95—Object–Oriented Programming. 9th European Confrence.

* cited by examiner

*Primary Examiner*—Antony Nguyen-Ba
(74) *Attorney, Agent, or Firm*—Beyer Weaver & Thomas, LLP

(57) ABSTRACT

Techniques for performing static binding of dispatched-calls in the presence of dynamic linking and loading are provided. A method for increasing the execution performance of a function at run-time includes compiling the function, which may either be interpreted or previously compiled, and identifying a call within the function to a process. The method also includes adding dependency information to the function. The dependency information is arranged to indicate a status of the function, and contains information pertaining to the class, the name, and the signature associated with the process. In one embodiment, the process is a virtual process, and the method includes analyzing a class structure associated with the function in order to determine when the virtual process is a substantially unique target of the call. In such an embodiment, the virtual process may be inlined into the function when it is determined that the virtual process is the substantially unique target of the call.

26 Claims, 7 Drawing Sheets

STATIC BINDING OF DYNAMICALLY-DISPATCHED CALLS IN THE PRESENCE OF DYNAMIC LINKING AND LOADING

CROSS REFERENCE TO RELATED APPLICATION

This application claims priority of provisional U.S. patent application Ser. No. 60/079,765, filed Mar. 24, 1998, which is incorporated herein by reference in its entirety for all purposes.

BACKGROUND OF THE INVENTION

The present invention relates to runtime compilation of software. More specifically, the invention relates to techniques for performing static binding of dynamically-dispatched calls in the presence of dynamic linking and loading.

The fundamental idea behind object-oriented languages is the combination of both data and the methods (or functions) that operate on that data into a single unit, which is called an object. An object's functions typically provide the only way to access the data that is encapsulated by the object. The data is accessed by sending a message to the object instructing the object to invoke the method specified by the message.

Efficient message dispatch is of paramount importance in object-oriented languages. This is because message dispatch is a very frequent operation in object-oriented programs and is performed at runtime; therefore, it should be as fast as possible. Message dispatch, however, is far from being a trivial operation. Unlike procedural programming languages (e.g., the C programming language) that can determine a function's address before runtime, object-oriented languages must determine the method that handles a message that has been dispatched to a receiver object dynamically at runtime, and it may involve an extensive search.

In order to better understand the complexities of message dispatch, an example of a class hierarchy will be described. FIG. 1 shows a class hierarchy including methods of each class. A class hierarchy 1 includes at its root a parent class A 3 that defines two virtual functions foo( ) and bar( ). Virtual functions are functions that may be defined in a parent class and redefined in associated children classes. Classes B 5 and class C 7 inherently include the data and methods of the parent class A 3. As shown, class B 5 does not redefine either of the virtual functions foo( ) and bar( ). However, class C 7 redefines the virtual function foo( ). When an object of class C 7 is requested to invoke the method foo( ), the method invoked will be the method defined by the class C 7, not the method defined in the parent class A 3. Classes D 9 and E 11 also redefine the method foo( ).

As it is generally impossible to determine the class of an object statically, the search for the correct method associated with the object is performed during runtime execution or, more specifically, during message dispatch. For example, assume a method is as follows:

```
test( )
{
    ...
    x.foo( );
    ...
}
```

If all of classes A–E are loaded at runtime execution, the determination of which function foo( ) to call will depend on which class x is an instance.

Furthermore, the test function may be compiled at runtime to increase performance. At runtime compilation, it is possible that only classes A 3 and B 5 are loaded. Accordingly, it appears from inspection of the loaded classes that one may assume that the message x.foo( ) will only invoke A::foo( ). Of course, if during runtime execution class C 7 is loaded, this assumption would prove to be false.

SUMMARY OF THE INVENTION

In general, embodiments of the present invention provide innovative techniques for performing static binding of dispatched-calls in the presence of dynamic linking and loading. As a method is being compiled at runtime, dynamically-dispatched calls are identified. The current class hierarchy is analyzed to determine how the calls may be optimized. The calls may be optimized and dependency information may be added to the compiled method so that when classes are loaded at runtime execution, it can be determined if the compiled method is still valid, should be interpreted (e.g., deoptimized), or recompiled (e.g., reoptimized).

According to one aspect of the present invention, a method for increasing the execution performance of a function at run-time includes compiling the function, which may either be interpreted or previously compiled, and identifying a call within the function to a process. The method also includes adding dependency information to the function. The dependency information is arranged to indicate a status of the function, and contains information pertaining to the class, the name, and the signature associated with the process.

In one embodiment, the process is a virtual process, and the method includes analyzing a class structure associated with the function in order to determine when the virtual process is a substantially unique target of the call. In such an embodiment, the virtual process may be inlined into the function when it is determined that the virtual process is the substantially unique target of the call. Alternatively, in such an embodiment, a direct call to the virtual process may be placed in the function.

According to another aspect of the present invention, a computer-implemented method for analyzing a first class associated with a class hierarchy of a system during run-time includes marking the first class and marking a second class that is a superclass of the first class to indicate an associated between the two class. A compiled function associated with the system is then inspected. The compiled function includes dependency information that is arranged to indicate a validity status of the compiled function as well as the optimization status of the compiled function. Inspecting the compiled function includes determining when at least one of the first class and the second class is identified in the dependency information. When it is determined that either the first class or both the first class and the second class is identified in the dependency information, a determination is made regarding whether the compiled function is invalid. In one embodiment, the method may include de-optimizing the compiled function when it is determined that the compiled function is invalid. De-optimizing the compiled function may return the function to an interpreted state.

Other features and advantages of the invention will become readily apparent upon review of the following detailed description in association with the accompanying drawings.

BRIEF DESCRIPTION OF THE DRAWINGS

The present invention, in specific embodiments, may be understood by reference to the following description taken in conjunction with the accompanying drawings in which.

DETAILED DESCRIPTION OF PREFERRED EMBODIMENTS

Definitions

Figure 1:
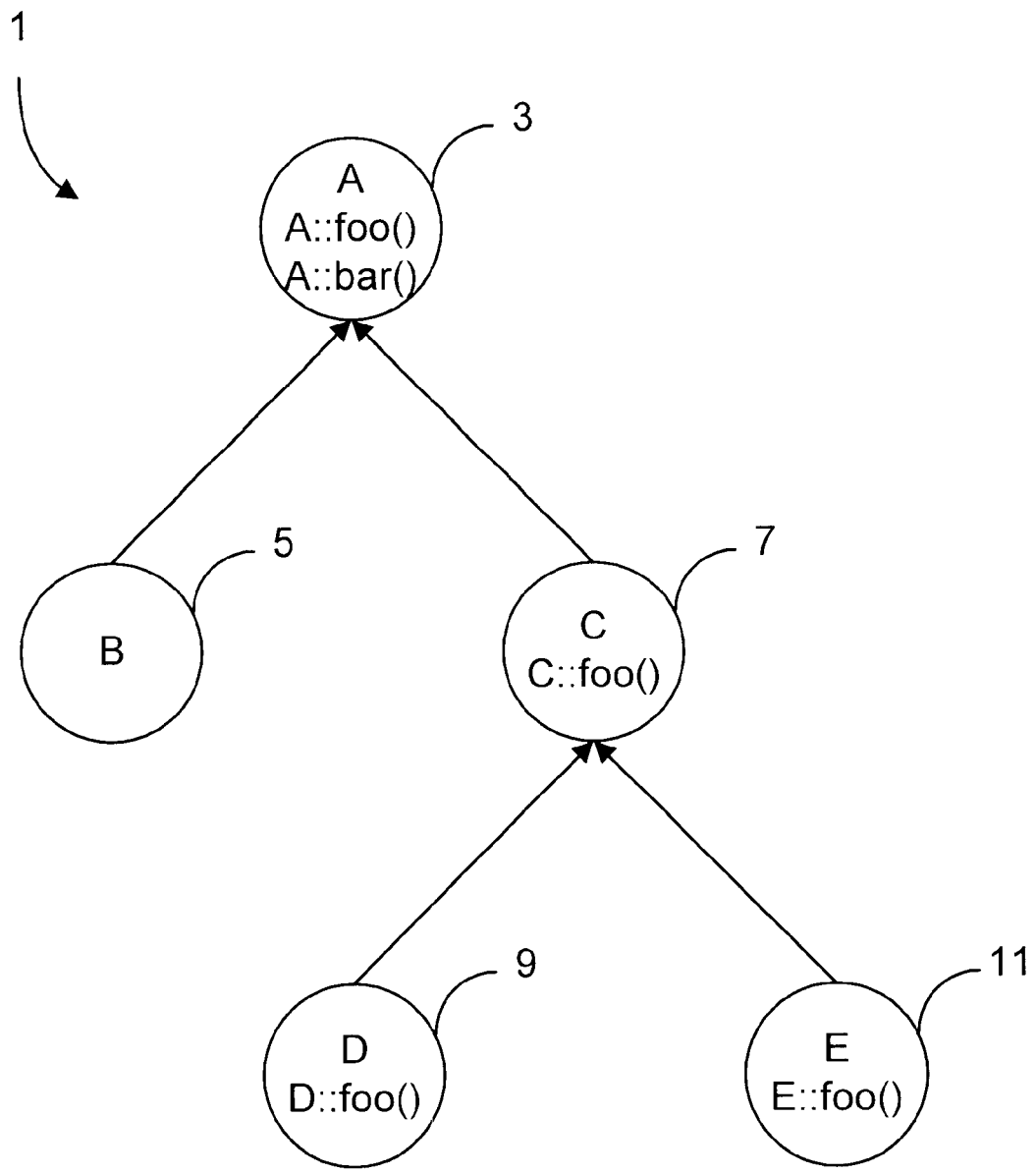
FIG. 1 illustrates a class hierarchy of classes including virtual functions in an object-oriented environment.

Machine instruction (or instruction)—An instruction that directs a computing device to perform an operation specified by an operation code (OP code) and optionally one or more operands.

Virtual machine instruction—An instruction for a software emulated microprocessor or computer architecture (also called virtual code).

Native machine instruction—An instruction that is designed for a specific microprocessor or computer architecture (also called native code).

Method—A software routine (also called a function, subroutine, procedure, and member function).

Runtime compilation—Compilation of code that is performed at runtime.

Runtime execution—Execution of code that is performed at runtime.

Detailed Description

In the description that follows, the present invention will be described in reference to preferred embodiments that statically bind dynamically-dispatched calls in Java virtual machine instructions (or bytecodes). However, the invention is not limited to any particular language, computer architecture, or specific implementation. Therefore, the description of the embodiments that follow is for purposes of illustration and not limitation.

The Java™ programming language is an object-oriented high level programming language developed by Sun Microsystems and designed to be portable enough to be executed on a wide range of computers ranging from small devices (e.g., pagers, cell phones and smart cards) up to supercomputers. Computer programs written in Java (and other languages) may be compiled into virtual machine instructions for execution by a Java virtual machine. In general the Java virtual machine is an interpreter that decodes and executes the virtual machine instructions.

The virtual machine instructions for the Java virtual machine are bytecodes, meaning they include one or more bytes. The bytecodes are stored in a particular file format called a "class file" that includes bytecodes for methods of a class. In addition to the bytecodes for methods of a class, the class file includes a symbol table as well as other ancillary information.

A computer program embodied as Java bytecodes in one or more class files is platform independent. The computer program may be executed, unmodified, on any computer that is able to run an implementation of the Java virtual machine. The Java virtual machine is a software emulator of a "generic" computer that is a major factor in allowing computer programs for the Java virtual machine to be platform independent.

The Java virtual machine may be implemented as a software interpreter. Conventional interpreters decode and execute the virtual machine instructions of an interpreted program one instruction at a time during execution, which is in contrast to compilers that decode source code into native machine instructions prior to execution so that decoding is not performed during execution. The Java virtual machine may include both an interpreter and compiler for runtime compilation. Typically, the Java virtual machine will be written in a programming language other than the Java programming language (e.g., the C++ programming language).

Figure 2:
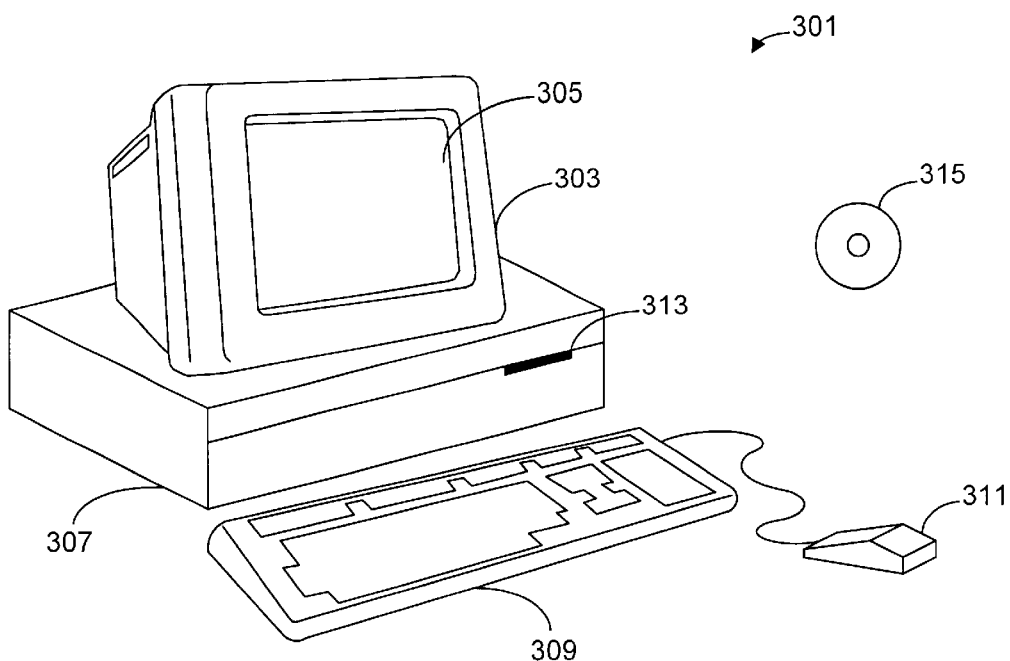
FIG. 2 illustrates an example of a computer system that may be utilized to execute the software of an embodiment of the invention.

FIG. 2 illustrates an example of a computer system that may be used to execute the software of an embodiment of the invention. FIG. 2 shows a computer system 301 that includes a display 303, screen 305, cabinet 307, keyboard 309, and mouse 311. Mouse 311 may have one or more buttons for interacting with a graphical user interface. Cabinet 307 houses a CD-ROM drive 313, system memory and a hard drive (see FIG. 3) which may be utilized to store and retrieve software programs incorporating computer code that implements the invention, data for use with the invention, and the like. Although the CD-ROM 315 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium.

Figure 3:
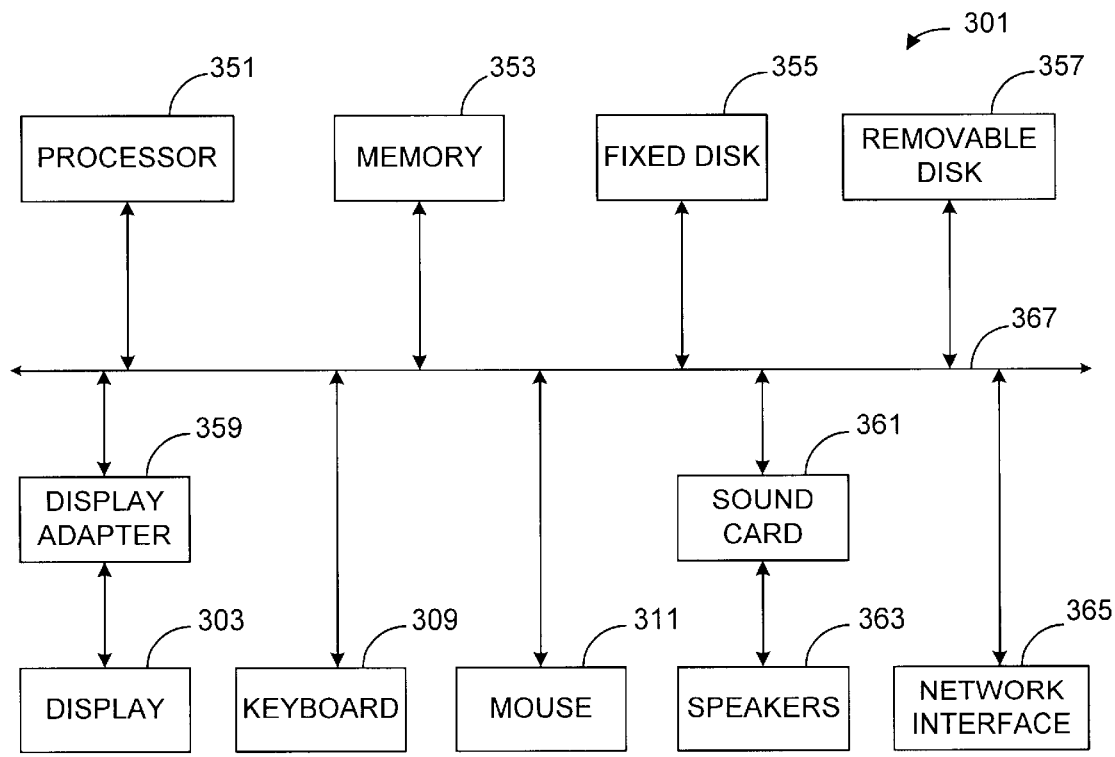
FIG. 3 shows a system block diagram of the computer system of FIG. 1.

FIG. 3 shows a system block diagram of computer system 301 used to execute the software of an embodiment of the invention. As in FIG. 2, computer system 301 includes monitor 303 and keyboard 309, and mouse 311. Computer system 301 further includes subsystems such as a central processor 351, system memory 353, fixed storage 355 (e.g., hard drive), removable storage 357 (e.g., CD-ROM drive), display adapter 359, sound card 361, speakers 363, and network interface 365. Other computer systems suitable for use with the invention may include additional or fewer subsystems. For example, another computer system could include more than one processor 351 (i.e., a multi-processor system), or a cache memory.

The system bus architecture of computer system 301 is represented by arrows 367. However, these arrows are illustrative of any interconnection scheme serving to link the subsystems. For example, a local bus could be utilized to connect the central processor to the system memory and display adapter. Computer system 301 shown in FIG. 3 is but an example of a computer system suitable for use with the invention. Other computer architectures having different configurations of subsystems may also be utilized.

Figure 4:
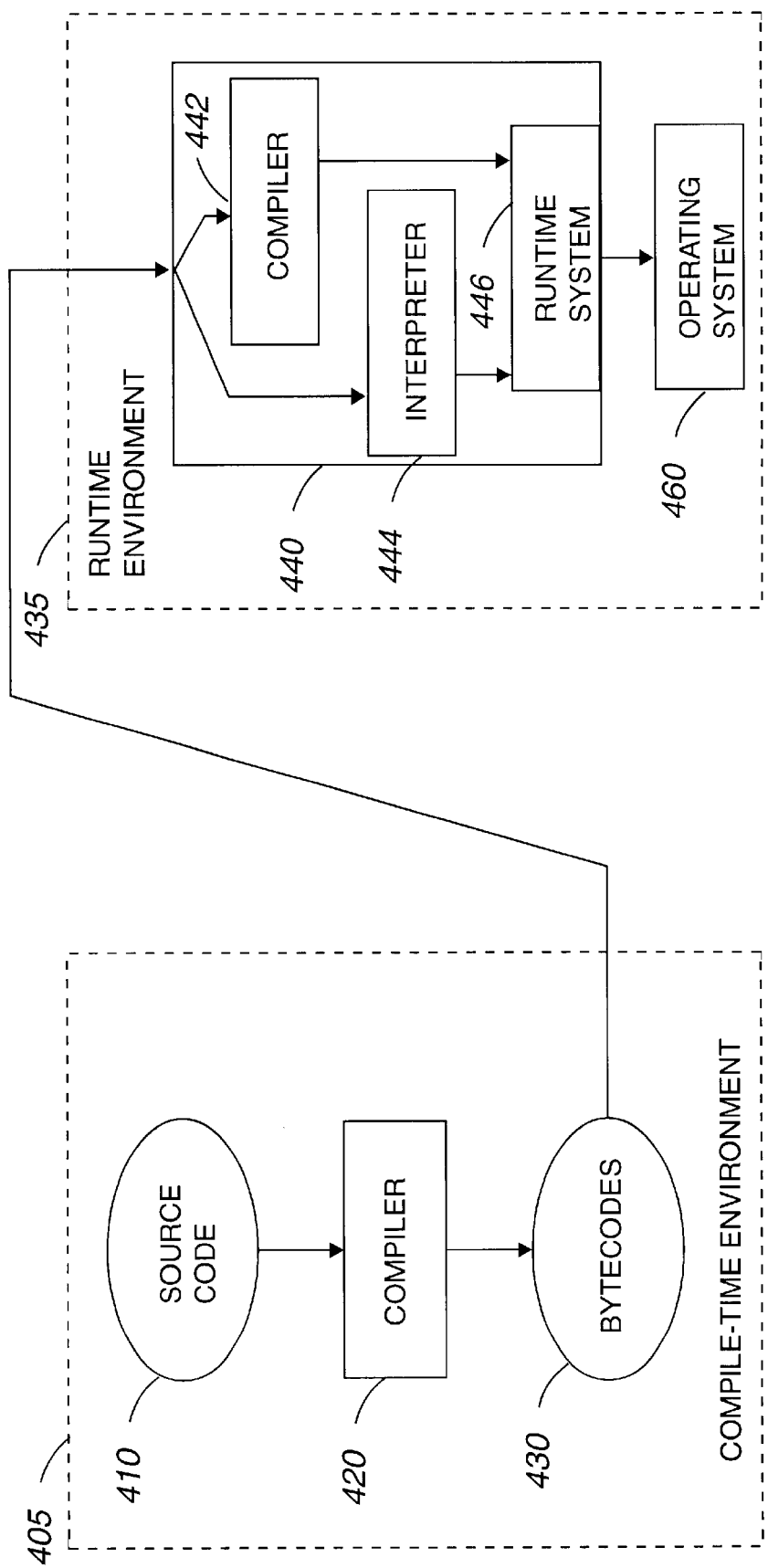
FIG. 4 is a diagrammatic representation of a virtual machine in accordance with an embodiment of the present invention.

Typically, computer programs written in the Java programming language are compiled into bytecodes or Java virtual machine instructions that are then executed by a Java virtual machine. The bytecodes are stored in class files that are input into the Java virtual machine for execution. A virtual machine may execute on a computer system such as the computer system discussed previously with respect to FIGS. 2 and 3. FIG. 4 is a diagrammatic representation of a virtual machine which is supported by computer system 301 of FIGS. 2 and 3, and is suitable for implementing the present invention. When a computer program, e.g., a computer program written in the Java™ programming language, is executed, source code 410 is provided to a compiler 420 within compile-time environment 405. Compiler 420 translates source code 410 into bytecodes 430. In general, source code 410 is translated into bytecodes 430 at the time source code 410 is created by a software developer.

Bytecodes 430 may generally be reproduced, downloaded, or otherwise distributed through a network, e.g., network interface 365 of FIG. 3, or stored on a storage device such as storage device 355 of FIG. 3. In the described embodiment, bytecodes 430 are platform independent. That is, bytecodes 430 may be executed on substantially any computer system that is running on a suitable virtual machine 440.

Bytecodes 430 are provided to a runtime environment 435 which includes virtual machine 440. In one embodiment, the virtual machine may be a Java™ virtual machine. Runtime environment 435 may generally be executed using a processor or processors such as processor 351 of FIG. 3. Virtual machine 440 includes a compiler 442, an interpreter 444, and a runtime system 446. Bytecodes 430 may be provided either to compiler 442 or interpreter 444.

When bytecodes 430 are provided to compiler 442, methods contained in bytecodes 430 are compiled into machine instructions. In one embodiment, compiler 442 is a just-in-time compiler which delays the compilation of methods contained in bytecodes 430 until the methods are about to be executed. When bytecodes 430 are provided to interpreter 444, bytecodes 430 are read into interpreter 444 one bytecode at a time. Interpreter 444 then performs the operation defined by each bytecode as each bytecode is read into interpreter 444. That is, interpreter 444 "interprets" bytecodes 430, as will be appreciated by those skilled in the art. In general, interpreter 444 processes bytecodes 430 and performs operations associated with bytecodes 430 substantially continuously.

When a method is invoked by another method, or is invoked from runtime environment 435, if the method is interpreted, runtime system 446 may obtain the method from runtime environment 435 in the form of a sequence of bytecodes 430, which may be directly executed by interpreter 444. If, on the other hand, the method which is invoked is a compiled method which has not been compiled, runtime system 446 also obtains the method from runtime environment 435 in the form of a sequence of bytecodes 430, then may go on to activate compiler 442. Compiler 442 then generates machine instructions from bytecodes 430, and the resulting machine-language instructions may be executed directly by processor 351 of FIG. 3. In general, the machine-language instructions are discarded when virtual machine 440 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Java classes (and interfaces) are dynamically loaded, linked and initialized. Loading is the process of the system finding the binary form of the class (e.g., the class file) and constructing from the binary form a Class object to represent the class. The Class class is a class for storing or representing the structures of classes. Linking is the process of taking a binary form of the class and combining it into the runtime state of the system so that it may be executed. Initialization of a class includes executing the class' static initializers and initializers for static fields declared in the class.

Each Java class has a constant pool associated with it. The constant pool is stored in the Java class file and serves a function similar to symbol tables. Typically, each entry in the constant pool is indexed by a number starting with one and ending with the number of entries in the constant pool. A method for a class accesses entries in the constant pool by the index and a method for one class may not access a constant pool for another class.

In addition to the constant pool storing literal constants, the constant pool stores classes, methods, fields, and interfaces symbolically. By storing these entries symbolically it is meant that the name identifying the entry is stored, not the physical address. In other words, if a class A has a field F, both the names of A and F (along with a type signature for F) may be stored in the constant pool. By storing names and not address, the Java runtime system resolves the symbolic reference into a physical address dynamically at runtime.

Figure 5:
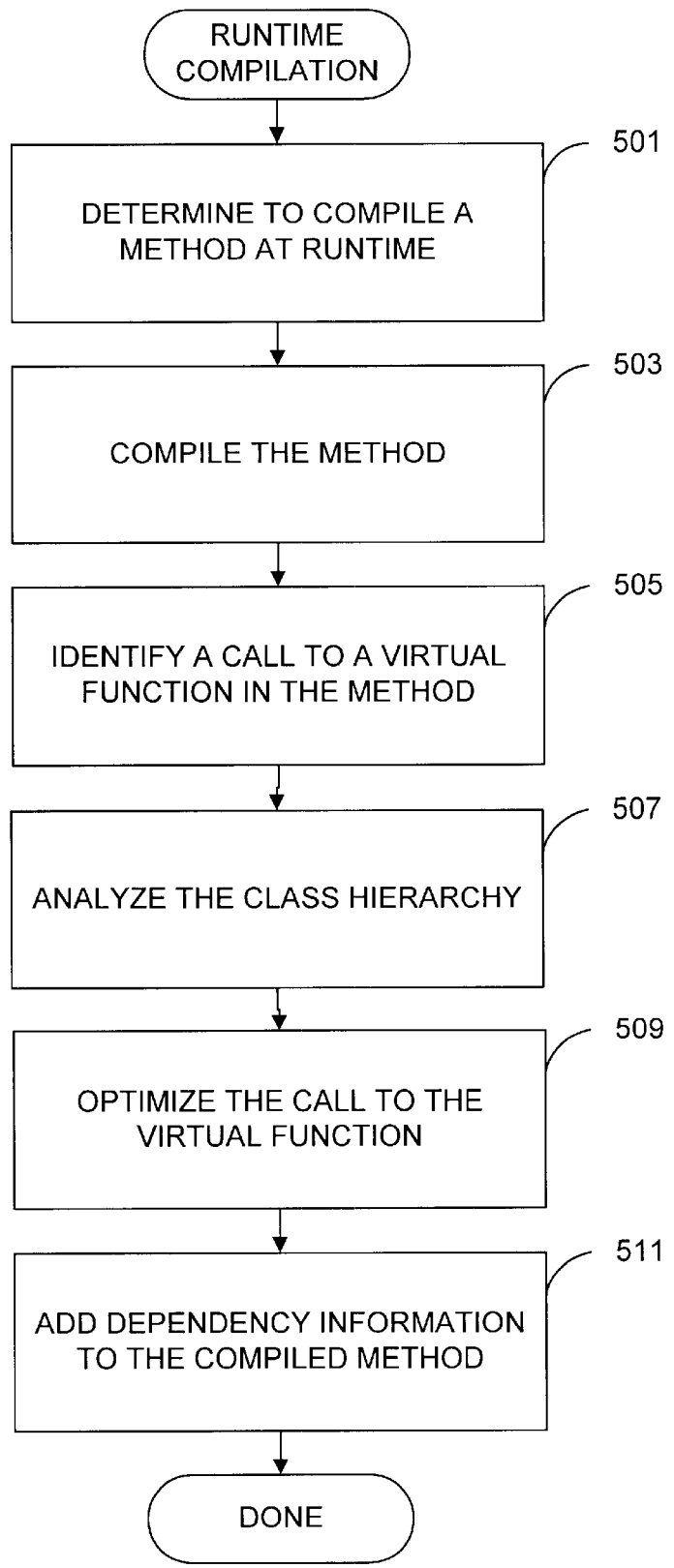
FIG. 5 illustrates a flowchart of an embodiment of the invention that compiles a method at runtime.

FIG. 5 illustrates a flowchart of an embodiment of the invention that compiles a method at runtime. At a step 501, the system determines that it is beneficial to compile a method. In general, compiling a method increases the execution performance of the method. However, there are many instances where methods are not compiled. By way of example, compiled methods may require more storage space than methods which are not compiled. In any event, once it is determined that a particular method should be compiled, that method is compiled at a step 503.

At a step 505, the system identifies a call to a virtual function in the method that is being compiled. As discussed above, resolution of a virtual function call is done dynamically at runtime. In the Java virtual machine instructions, the call is an invokevirtual instruction.

The system analyzes the class hierarchy at run-time compilation at a step 507. The class hierarchy may indicate that currently only one function of a loaded class would be the recipient of the virtual function call. If only one function of the loaded class would be the recipient of the virtual function call, the system may place a direct call to that function in the compiled method. Additionally, the system may inline the whole function into the compiled method. Inlining the whole function requires more storage space for the compiled method, but results in a faster performance.

In some cases, there is more than one function of loaded classes that could be the recipient of the virtual function call. If such is the case, the system may inline a decision tree or hash table that includes direct calls to the functions and/or inline functions. That is, the call to the virtual function as discussed with respect to step 505 may be optimized at a step 909. Techniques for performing virtual function calls are described in application Ser. No. 08/944,332, filed Oct. 6, 1997, which is hereby incorporated by reference for all purposes.

At a step 511, the system adds dependency information to the compiled method. The dependency information may include the class, function name, and signature (i.e., parameter types) of each virtual function that has been optimized at step 509. In this manner, when classes are loaded at runtime execution, the dependency information may be checked for a compiled method to determine if the compiled method is still valid, should be deoptimized, or should be reoptimized. This process will be described in more detail below with reference to FIG. 7.

Figure 6:
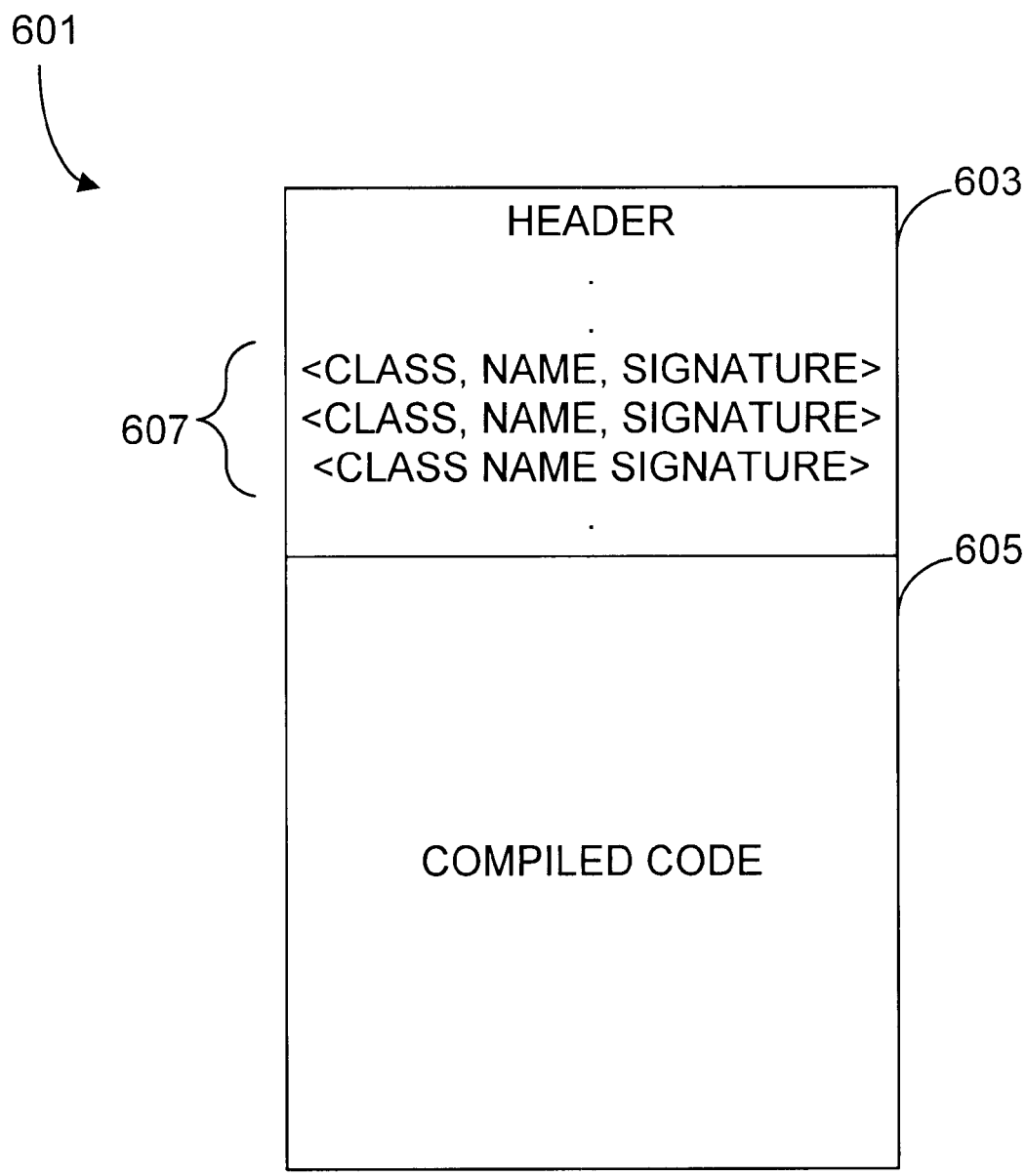
FIG. 6 shows an embodiment of a compiled method including dependency information.

FIG. 6 shows an embodiment of a compiled method with dependency information. A compiled method 609 includes a header 603 and compiled code 605. Header 603 includes, among other things, dependency information 607. Dependency information 607, in the described embodiment, is a list of the class, the name, and the signature of all the virtual function calls that were optimized in compiled method 609. Although this information may be stored as a simple list, a variety of other storage techniques may be utilized.

Figure 7:
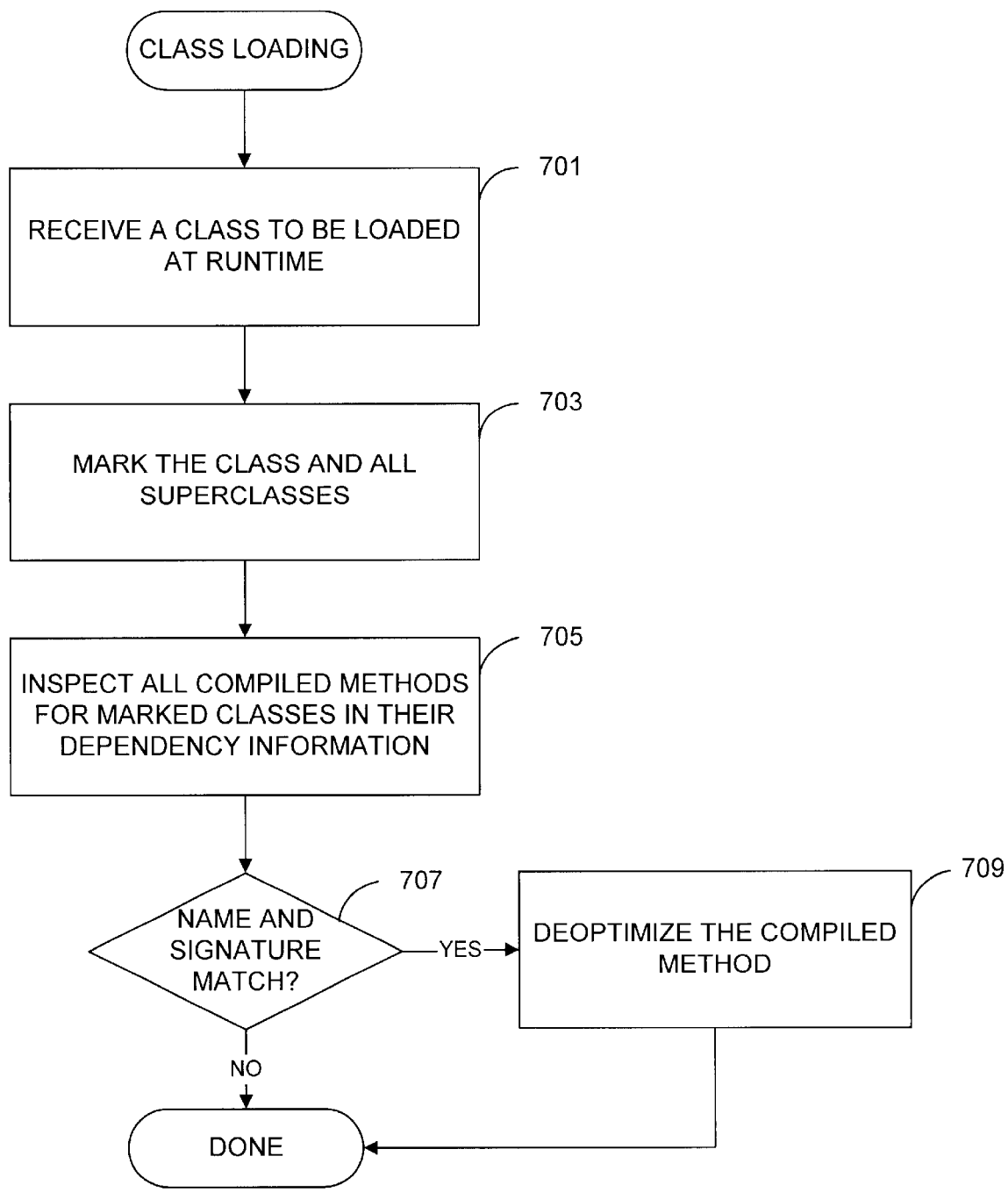
FIG. 7 illustrates a flowchart of a process of class loading during runtime execution in accordance with an embodiment of the present invention.

FIG. 7 illustrates a flowchart of a process of class loading during runtime execution. At a step 701, the system receives a class to be loaded at runtime. The system then marks the class and all of its superclasses at a step 703. The classes may be marked by setting a boolean field in a class hierarchy structure (see FIG. 8).

At a step 705, the system inspects all the compiled methods to determine if they include any of the marked classes in their dependency information. As discussed above, the dependency information may be stored in a header of the compiled method. If any of the marked classes are included in a compiled method's dependency information, the system determines if there is a function name and signature match at a step 707.

By determining if there is a function name and signature match, the system ascertains whether loading the class causes any of the compiled methods to effectively be invalidated. In other words, the determination of whether there is a function name and signature match determines whether loading the class generates a new, and previously unaccounted for, recipient for a virtual function call that has been optimized.

For example, referring again to FIG. 1, if only classes A 3 and B 5 are loaded at runtime compilation, the system may place a direct call to A::foo( ) (or even inline the whole function) in a compiled method since there is only one function that could be the recipient of the virtual function call. However, if during runtime execution, class C 7 is loaded then there another possible recipient for the virtual function call (i.e., C::foo( )). Thus, the compiled method should be either deoptimized or reoptimized. Techniques for deoptimization of compiled methods are described in application Ser. No. 08/944,330, filed Oct. 6, 1997, which is hereby incorporated by reference for all purposes.

If there is a match at step 707 for a compiled method, the compiled method may be deoptimized at a step 709. Deoptimizing the compiled method may include reverting, or otherwise "de-compiling," the method to its interpreted form. Additionally, the system may reoptimize the compiled method so that it now takes into account the newly loaded class.

Figure 8:
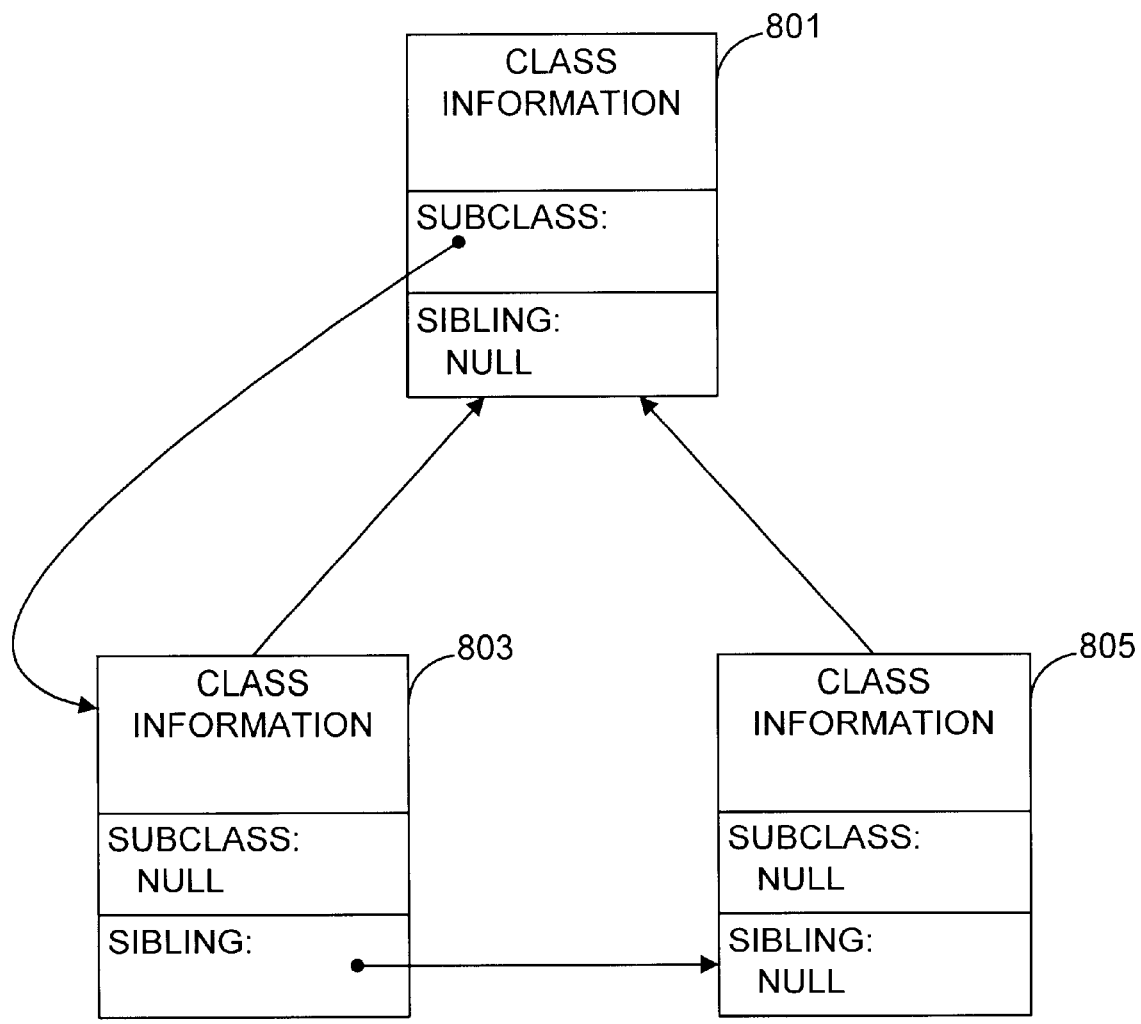
FIG. 8 shows a representation of a class hierarchy in memory in accordance with an embodiment of the present invention.

FIG. 8. shows a representation of a class hierarchy in memory. A class 801 is shown at the root indicating it is a superclass to classes below it. As shown, classes 803 and 805 are subclasses of class 801. The class information for each class may include a boolean field that is used to mark the classes as in step 703 of FIG. 7.

Additionally, the class information for each class may include a subclass pointer and a sibling pointer. The subclass pointer points to a first subclass, which in this example is class 803. The sibling pointer form a linked list of the classes that are siblings. As shown, the sibling pointer of class 803 points to class 805. Utilizing the subclass and sibling pointers, the system in an embodiment of the invention is able to easily traverse the class hierarchy.

Conclusion

While the above is a complete description of preferred embodiments of the invention, various alternatives, modifications, and equivalents may be used. It should be evident that the invention is equally applicable by making appropriate modifications to the embodiments described above. For example, although the embodiments described have been in reference to Java virtual machine instructions, the principles of the present invention may be readily applied to other instructions. Therefore, the above description should not be taken as limiting the scope of the invention.

What is claimed is:

1. A run-time based computer-implemented method for enhancing the execution performance of a function at run-time, the computer-implemented method comprising:

compiling the function at run-time;

identifying a call to a process at run-time, the call to the process being included in the function;

adding dependency information to the function at run-time, wherein the dependency information is arranged to indicate a status of the function, the dependency information including class information, name information, and signature information associated with the process, wherein the status of the function is arranged to indicate a validity of the function and a compilation status of the function;

determining whether the compiled function is valid based on the dependency information; and when it is determined that the compiled function is invalid, determining at least one of whether the function is suitable for deoptimization and whether the function is suitable for reoptimization.

2. A computer-implemented method as recited in claim 1 wherein the process is a virtual process, the computer-implemented method further including:

analyzing a class structure associated with the function, wherein analyzing the class structure includes determining when the virtual process is a substantially unique target of the call.

3. A computer-implemented method as recited in claim 2, the computer-implemented method further including:

inlining the virtual process into the function when it is determined that the virtual process is the substantially unique target of the call.

4. A computer-implemented method as recited in claim 2, the computer-implemented method further including:

placing a direct call to the virtual process in the function.

5. A computer-implemented method as recited in claim 1 further including:

determining when the function is suitable for compilation.

6. A computer-implemented method as recited in claim 1 further comprising:

loading a class that is associated with the function;

determining when the function is not a substantially unique caller to the process; and de-compiling the function when it is determined that the function is not a substantially unique caller to the process.

7. A computer-implemented method as recited in claim 1 further comprising:

loading a class that is associated with the function;

determining when the function is not a substantially unique caller to the process; and re-compiling the function when it is determined that the function is not a substantially unique caller to the process.

8. A computer-implemented method as recited in claim 1 further including:
loading a class, the class being associated with the function.

9. A computer-implemented method as recited in claim 1, further including:
loading a class, wherein the class is potentially associated with the compiled function.

10. A run-time based computer-implemented method for enhancing the execution performance of a function at run-time, the computer-implemented method comprising:
compiling the function at run-time;
identifying a call to a process at run-time, the call to the process being included in the function;
adding dependency information to the function at run-time, wherein the dependency information is arranged to indicate a status of the function, the dependency information including class information, name information, and signature information associated with the process, wherein the status of the function is arranged to indicate a validity of the function and a compilation status of the function;
loading a class, wherein the class is potentially associated with the compiled function;
determining whether the compiled version of the function remains valid after the class is loaded, based on the dependency information; and
when it is determined that the compiled version of the function is invalid, determining at least one of whether the function is suitable for deoptimization and whether the function is suitable for reoptimization.

11. A run-time based computer-implemented method for analyzing a first class associated with a class hierarchy of a system during run-time, the computer-implemented method comprising:
marking the first class during run-time;
marking a second class during run-time, the second class being included in the class hierarchy, the second class further being associated with the first class, wherein marking the second class substantially identifies the second class as being associated with the first class;
inspecting a compiled function associated with the system during run-time, the compiled function including dependency information, the dependency information being arranged to indicate a validity status of the compiled function and the optimization status of the compiled function, wherein inspecting the compiled function includes determining when at least one of the first class and the second class is identified in the dependency information;
determining when the compiled function is invalid when it is determined that at least one of the first class and the second class is identified in the dependency information; and
when it is determined that the optimization status of the compiled function is invalid, determining at least one of whether the function is suitable for deoptimization and whether the function is suitable for reoptimization.

12. A computer-implemented method as recited in claim 11 further including:
de-compiling the compiled function when it is determined that the compiled function is invalid, wherein de-compiling the compiled function effectively places the compiled function in an interpreted form.

13. A computer-implemented method as recited in claim 11 further including:
re-compiling the compiled function when it is determined that the compiled function is invalid, wherein re-compiling the compiled function allows the compiled function to account for the first class.

14. A computing system suitable for enhancing the execution performance of a function at run-time, the computing system comprising:
a processor;
a compiler arranged to compile the function at run-time;
a call identifier arranged to identify a call to a process at run-time, the call to the process being included in the function; and
a mechanism suitable for:
adding dependency information to the function at run-time, wherein the dependency information is arranged to indicate a status of the function, the status being arranged to include a validity status of the function;
determining whether the compiled function is valid based on the dependency information; and
when it is determined that the compiled the function is invalid, determining at least one of whether the function is suitable for deoptimization and whether the function is suitable for reoptimization.

15. A computing system as recited in claim 14, wherein the process is a virtual process, the computing system further including:
an analyzer for analyzing a class structure associated with the function, wherein analyzing the class structure includes determining when the virtual process is a substantially unique target of the call.

16. A computing system as recited in claim 15, the computing system further including:
an inliner arranged for inlining the virtual process into the function when it is determined that the virtual process is the substantially unique target of the call.

17. A computer program product for enhancing the execution performance of a function at run-time, the computer program product comprising:
computer code that compiles the function at run-time;
computer code that identifies a call to a process at run-time, the call to the process being included in the function;
computer code that adds dependency information to the function at run-time, wherein the dependency information is arranged to indicate a status of the function, the status being arranged to include when a validity status of the function;
computer code that determines whether the compiled function is valid based on the dependency information; and
computer code that when it is determined that the compiled the function is invalid determines at least one of whether the function is suitable for deoptimization and whether the function is suitable for reoptimization;
a computer-readable medium that stores the computer codes.

18. A computer program product as recited in claim 17 wherein the process is a virtual process, the computer program product further including:
computer code that analyzes a class structure associated with the function, wherein analyzing the class structure includes determining when the virtual process is a substantially unique target of the call.

19. A computer program product as recited in claim 18, further including:

computer code that inlines the virtual process into the function when it is determined that the virtual process is the substantially unique target of the call.

20. A computer program product as recited in claim 18, the computer program product further including:

computer code that places a direct call to the virtual process in the function.

21. A computer program product as recited in claim 17, further including:

computer code that determines when the function is suitable for compilation.

22. A computer program product as recited in claim 17 wherein the computer-readable medium is one selected from the group consisting of a floppy disk, a hard disk, a tape, a data signal embodied in a carrier wave, a CD-ROM, a system memory, and a flash memory.

23. A computer program product as recited in claim 17, further including:

computer code that loads a class, the class being associated with the function.

24. A computer program product for enhancing the execution performance of a function at run-time, the computer program product comprising:

computer code that compiles the function at run-time;

computer code that identifies a call to a process at run-time, the call to the process being included in the function;

computer code that adds dependency information to the function at run-time, wherein the dependency information is arranged to indicate a status of the function, the status being arranged to include when a validity status of the function;

computer code that is arranged to load a new class;

computer code that determines whether the compiled version of the function remains valid after a new class is loaded based on the dependency information and for determining whether the function is suitable for at least one of deoptimization and reoptimization when it is determined that the compiled version of the function is invalid; and a computer-readable medium that stores the computer codes.

25. A run-time based computer-implemented method for enhancing the execution performance of a function at run-time, the computer-implemented method comprising:

compiling the function at run-time;

identifying a call to a process at run-time, the call to the process being included in the function;

adding dependency information to the function at run-time, wherein the dependency information is arranged to indicate a status of the function;

determining whether the compiled function is valid based on the dependency information; and determining whether the function is suitable for deoptimization or reoptimization when it is determined that the compiled function is invalid.

26. A computer-implemented method as recited in claim 25, wherein the dependency information includes class information, name information, and signature information associated with the process, and wherein the status of the function is arranged to indicate a validity of the function and a compilation status of the function.

* * * * *